(12) United States Patent
Zhou et al.

(10) Patent No.: US 11,257,234 B2
(45) Date of Patent: *Feb. 22, 2022

(54) METHOD FOR THREE-DIMENSIONAL MEASUREMENT AND CALCULATION OF THE GEOGRAPHIC POSITION AND HEIGHT OF A TARGET OBJECT BASED ON STREET VIEW IMAGES

(71) Applicant: Nanjing Polagis Technology Co. Ltd, Jiangsu (CN)

(72) Inventors: Liangchen Zhou, Jiangsu (CN); Zhengyuan Lu, Jiangsu (CN); Guonian Lu, Jiangsu (CN)

(73) Assignee: Nanjing Polagis Technology Co. Ltd, Nanjing (CN)

( * ) Notice: Subject to any disclaimer, the term of this patent is extended or adjusted under 35 U.S.C. 154(b) by 173 days.

This patent is subject to a terminal disclaimer.

(21) Appl. No.: 16/422,077

(22) Filed: May 24, 2019

(65) Prior Publication Data

US 2020/0372667 A1 Nov. 26, 2020

(51) Int. Cl.
*G06T 7/00* (2017.01)
*G06T 7/55* (2017.01)
*G06T 7/73* (2017.01)

(52) U.S. Cl.
CPC ............. *G06T 7/55* (2017.01); *G06T 7/74* (2017.01); *G06T 7/97* (2017.01); *G06T 2207/10028* (2013.01)

(58) Field of Classification Search
CPC ... G06T 2207/10028; G06T 7/55; G06T 7/74; G06T 7/97; G06T 7/70; G06T 7/62; G01S 5/16
See application file for complete search history.

(56) References Cited

U.S. PATENT DOCUMENTS

| | | | | |
|---|---|---|---|---|
| 4,175,328 A | * | 11/1979 | Kellner | G01C 11/00 33/1 A |
| 5,949,548 A | * | 9/1999 | Shirai | G01C 15/002 250/559.38 |
| 6,384,902 B1 | * | 5/2002 | Schneider | G01C 15/002 33/284 |
| 6,688,010 B1 | * | 2/2004 | Schwaerzler | G01B 3/004 33/290 |

(Continued)

*Primary Examiner* — Siamak Harandi
(74) *Attorney, Agent, or Firm* — PROI Intellectual Property US; Klaus Michael Schmid

(57) ABSTRACT

The present invention relates to a method for three-dimensional measurement and calculation of the geographic position and height of a target object based on street view images. The method comprises: selecting a target object in a street view map at first and then selecting two appropriate viewpoints according to the target object and obtaining the longitudes and latitudes of the two viewpoints; obtaining three street view images at different viewing angles under the viewpoints respectively; calculating the horizontal angles and pitch angles of the target object under the viewpoints according to the three street view images; determining two spatial straight lines according to the longitudes and latitudes of the viewpoints and the viewing angles from the viewpoints to the bottom of the target object, which intersect forward, and calculating the intersection of the two straight lines, which is the geographic position of the target object.

12 Claims, 4 Drawing Sheets

(56) References Cited

U.S. PATENT DOCUMENTS

| | | | |
|---|---|---|---|
| 8,577,604 B1* | 11/2013 | Ogale | G01C 21/3602 |
| | | | 701/450 |
| 8,897,482 B2* | 11/2014 | Mein | G06T 7/593 |
| | | | 382/100 |
| 9,317,966 B1* | 4/2016 | Deephanphongs | H04N 13/20 |
| 10,008,027 B1* | 6/2018 | Baker | G06T 7/50 |
| 10,665,035 B1* | 5/2020 | Perkins | G06T 7/579 |
| 2003/0048438 A1* | 3/2003 | Kawamura | G01C 15/00 |
| | | | 356/141.1 |
| 2003/0160757 A1* | 8/2003 | Shirai | G01C 15/00 |
| | | | 345/156 |
| 2004/0233461 A1* | 11/2004 | Armstrong | G01C 11/025 |
| | | | 356/620 |
| 2005/0057745 A1* | 3/2005 | Bontje | G01C 15/002 |
| | | | 356/139.03 |
| 2006/0017938 A1* | 1/2006 | Ohtomo | G01C 1/04 |
| | | | 356/611 |
| 2006/0021236 A1* | 2/2006 | Endo | G01C 15/002 |
| | | | 33/290 |
| 2006/0167648 A1* | 7/2006 | Ohtani | G01C 1/04 |
| | | | 702/150 |
| 2007/0008515 A1* | 1/2007 | Otani | G01C 15/00 |
| | | | 356/5.02 |
| 2009/0109420 A1* | 4/2009 | Kludas | G01C 11/06 |
| | | | 356/3.01 |
| 2009/0138233 A1* | 5/2009 | Kludas | G06K 9/32 |
| | | | 702/158 |
| 2010/0037474 A1* | 2/2010 | Hertzman | G01C 15/002 |
| | | | 33/290 |
| 2010/0074532 A1* | 3/2010 | Gordon | G06T 7/536 |
| | | | 382/203 |
| 2010/0103431 A1* | 4/2010 | Demopoulos | B25J 9/1692 |
| | | | 356/622 |
| 2011/0043620 A1* | 2/2011 | Svanholm | G06T 7/55 |
| | | | 348/135 |

* cited by examiner

METHOD FOR THREE-DIMENSIONAL MEASUREMENT AND CALCULATION OF THE GEOGRAPHIC POSITION AND HEIGHT OF A TARGET OBJECT BASED ON STREET VIEW IMAGES

TECHNICAL FIELD

The present invention relates to the fields of street view map, electronic cartography, photogrammetry, GIS, Web service and computer graphics, is designed to achieve direct measurement of actual geographic positions of target objects in a street view map on the basis of the existing street view map resources and specifically relates to Http request, determination of spatial straight lines under a polar coordinate system, forward intersection and other contents.

DESCRIPTION OF THE BACKGROUND

Street view map is a live map service. It provides users with street panorama of cities, streets or other environments in a range of 360° in the horizontal direction and 180° in the vertical direction so that the users can view scenes in different positions of and on the two sides of each street on the ground of the selected city. It is a three-dimensional virtual display technology, which uses a plurality of cameras to conduct multi-angle surrounding image acquisition of real scenes and then uses a computer to conduct post fusion processing and loads a player.

In recent years, following the rapid development of Internet technology, more and more application services on the basis of panorama image information, such as three-dimensional panorama and virtual tour, have entered people's daily life. Street view map achieves the scenes of virtual reality that are in combination of 2D and 3D, making users as if personally on the scenes.

Currently, IT and Internet companies like foreign Google and domestic Baidu and Tencent all have launched map service of city street view. However, these street view maps are mainly for exhibition and display, seriously wasting the enormous information contained in street view images. Compared with conventional 2D maps, street view maps are unable to achieve positioning and measurement of surface features in street view images, significantly limiting the extensive application of panoramic technique.

To tackle the defect that existing street view maps can be used for exhibition and display only, the present invention provides a three-dimensional measurement and calculation method based on a street view map to achieve fast acquisition of actual geographic coordinates and heights of surface features in street view images.

SUMMARY OF THE INVENTION

The present invention is intended to solve the problem that existing street view maps are unable to acquire the actual geographic coordinates, height and other information of target objects in street view images. On the basis that a street view map provides more authentic, accurate and detailed map service for users, the present invention may measure the actual geographic positions and heights of target objects in the street view map, utilize the specific and rich information in the street view map and expand the application of street view in real production and life.

In order to achieve the foregoing technical objective, the present invention adopts the following technical solution:

A method for three-dimensional measurement and calculation of the geographic position and height of a target object based on street view images, comprising the following steps:

Step 1: selecting two viewpoints in the viewing angle range covering the target object to be measured and calculated in the street view map;

Step 2: obtaining the longitudes and latitudes of the two selected viewpoints;

Step 3: obtaining three street view images: street view image 1, street view image 2 and street view image 3 at different viewing angles under the two viewpoints respectively, wherein the street view image 1 is a reference image, the street view image 2 and the street view image 1 have different horizontal angles and a same pitch angle, and the street view image 3 and the street view image 1 have a same horizontal angle and different pitch angles;

Step 4: calculating the viewing angles from the two viewpoints to a point on the bottom of the target object, including horizontal angle and pitch angle;

Step 5: establishing two spatial straight lines according to the two viewpoints in step 4 and a point on the bottom of the target object, which intersect forward, and calculating the longitude and latitude of the intersection, i.e., the actual geographic position of the target object;

Step 6: calculating the distance from any of the two selected viewpoints to the target object, and calculating the relative heights of the bottom and top of the target object from the viewpoint according to the pitch angles from the viewpoint to a point on the bottom/top of the target object;

Step 7: obtaining the actual height of the target object from the relative heights between the bottom/top of the target object and the viewpoint.

In said method of the present invention, said viewpoints mean the geographic positions where the camera is located when shooting the street view images, and are expressed with longitudes and latitudes. Different viewpoints mean different geographic positions where the camera is located when shooting street view images. In said step 1, during selection of viewpoints, an appropriate viewpoint is determined if the target object is adjusted to an appropriate position of the street view map by rotating the street view map; specifically, under a viewpoint, if the target object is roughly located in the center of the screen and clearly brought into the field of view as a whole without blockage of obstacles by rotating and adjusting street view images, then this viewpoint is selected.

In said step 2, longitudes and latitudes of viewpoints are obtained from the shooting parameters of the viewpoints.

In said step 3, three street view images at different viewing angles are obtained under the two viewpoints respectively, wherein the street view image 1 is a reference image and its pitch angle is 0, the street view images 2 and 1 have different horizontal angles and a same pitch angle, and the street view images 3 and 1 have a same horizontal angle and different pitch angles.

During selection of viewpoints, street view images are rotated and adjusted to make the target object located in an appropriate position of the screen, and images are scaled up or down so that the target object is neither too small to see clearly and nor too large to be within the range of the screen.

In said step 4, under each viewpoint, the horizontal angle from the viewpoint to a point on the bottom of the target object is calculated according to the street view images 1 and 2 to which the viewpoint corresponds, and the pitch angle from the viewpoint to the target object is calculated according to the street view images 1 and 3 to which the viewpoint corresponds.

Said point on the bottom of the target object is the central point or angular point of the bottom of the target object; said horizontal angle and pitch angle are parameters of viewing angle and express the azimuth information of the camera lens when the camera shoots street view images.

Said horizontal angle means the compass heading of the lens of the camera in use. The range of acceptable values is 0°~360° (both values denote north, 90° denotes east, and 180° denotes south).

Said pitch angle means the upward or downward angle of the lens of the camera in use relative to the Street View vehicle. A positive value means an upward angle of the camera lens (90° means the camera lens is vertically upward), while a negative value means a downward angle of the camera lens (−90° means the camera lens is vertically downward).

The process of solving the horizontal angle from said viewpoint to the target object is as follows:

Firstly, the pixel positions of the central point of the street view image 2 and a point on the bottom of the target object are marked in the street view image 1; the central point X1 of the street view image 1, the central point X2 of the street view image 2 and the bottom T of the target object are projected on the horizontal plane where the viewpoint O is located. A straight line OO1 is drawn via the viewpoint O in a direction at a horizontal angle of 0, and a perpendicular line of OO1 is drawn via X2, with the foot of perpendicular being O', where the intersection between O'X2 and OX1 and the intersection between O'X2 and OT are X1' and T' respectively;

The horizontal angle of the target object at this viewpoint is calculated, i.e., ∠O'OT is calculated, and set as ht. The horizontal angles of the centers of street view images 1 and 2 are known, i.e., ∠O'OX1 and ∠O'OX2, expressed with h1 and h2.

$$\tan h1 = \frac{O'X1'}{OO'} \quad \text{(Formula 1)}$$

$$\tan h2 = \frac{O'X2'}{OO'} \quad \text{(Formula 2)}$$

$$\tan ht = \frac{O'T'}{OO'} \quad \text{(Formula 3)}$$

From (Formula 2)−(Formula 1) and (Formula 3)−(Formula 1), (Formula 4) and (Formula 5) are obtained:

$$\tan h2 - \tan h1 = \frac{O'X2'}{OO'} - \frac{O'X1'}{OO'} = \frac{X1'X2'}{OO'} \quad \text{(Formula 4)}$$

$$\tan ht - \tan h1 = \frac{O'T}{OO'} - \frac{O'X1'}{OO'} = \frac{X1'T'}{OO'} \quad \text{(Formula 5)}$$

From (Formula 4)/(Formula 5), (Formula 6) is obtained:

$$\frac{(\tan h2 - \tan h1)}{\tan ht - \tan h1} = \frac{X1'X2'}{X1'T'} \quad \text{(Formula 6)}$$

From (Formula 6), the following formula may be obtained:

$$\tan ht = (\tan h2 - \tan h1) * \frac{X1'T'}{X1'X2} + \tan h1$$

In actual calculation, ∠X1OX2 is in the range of 10°~15°, and the pixel distance between X1 and X2 is much smaller than the actual distance between point O and point X1. Therefore, in ΔOX1X2 and ΔOX1'X2, $$\frac{X1'T'}{X1'X2}$$

is approximately equivalent to $$\frac{X1T}{X1X2}.$$

Where $$\frac{X1T}{X1X2}$$

may be obtained from the pixel position of each point in the image, so the horizontal angle of the bottom of the target object under this viewpoint can be calculated:

$$\tan ht = (\tan h2 - \tan h1) * \frac{X1T}{X1X2} + \tan h1$$

$$ht = \text{Arctan} ht$$

The process of solving the pitch angle from said viewpoint to the target object is as follows: Firstly, the pixel positions of the central point of the street view image 3 and the top and bottom of the target object are marked in the street view image 1; the central point Y1 of the street view image 1, the central point Y3 of the street view image 3, the top Tt of the target object and the bottom Tb of the target object are projected on the vertical plane where the viewpoint O is located.

The horizontal angles of the bottom and top of the target object under this viewpoint are calculated, i.e., ∠TtOY1 and ∠TbOY1 are calculated, set as Pt. It is known that the pitch angle of the central point of the street view image 1 is 0° and the pitch angle of the central point of the street view image 3 is p3.

$$\tan pt = \frac{Y1Tt}{Y1Y3} * \tan p3$$

$$\tan pb = \frac{Y1Tb}{Y1Y3} * \tan p3$$

Where $$\frac{Y1Tt}{Y1Y3} \text{ and } \frac{Y1Tb}{Y1Y3}$$

can be calculated according to the distances of image pixel points. Thereby the pitch angles of the bottom and top of the target object under the current viewpoint can be obtained.

In said step 5, two spatial straight lines are established in the polar coordinate system according to the two viewpoints and the horizontal angles from the viewpoints to the bottom of the target object, and intersect forward, and the intersection of the two straight lines is calculated, i.e., the longitude and latitude of the target object.

In said step 6, the relative heights of the bottom and top of the target object from a viewpoint are calculated by the following method: calculating the distance from any viewpoint to the bottom of the target object on a horizontal plane according to the longitude and latitude of the viewpoint and the longitude and latitude of the bottom of the target object; and calculating the relative heights of the bottom and top of the target object from the viewpoint respectively according to the pitch angles from the viewpoint to the top and bottom of the target object. To facilitate adjustment, preferably said point on the bottom or top of the target object is the angular point/central point on the bottom or top of the target object; the line connecting a point selected on the bottom and a point selected on the top is a vertical straight line.

In said step 7, the actual height of the target object is calculated by the following method: obtaining the actual height of the target object by subtracting the relative height between the bottom of the target object and the viewpoint from the relative height between the top of the target object and the viewpoint.

The calculation method of the present invention synoptically comprises: selecting a target object in a street view map at first and then selecting two appropriate viewpoints according to the target object and obtaining longitudes and latitudes of viewpoints according to the shooting parameters of the viewpoints; obtaining three street view images at different viewing angles under the two viewpoints respectively, wherein image 1 is a reference image and its pitch angle is 0, image 2 and image 1 have different horizontal angles and a same pitch angle and image 3 and image 1 have a same horizontal angle and different pitch angles; calculating the horizontal angle from each viewpoint to the target object according to image 1 and image 2 to which the viewpoint corresponds, and calculating the pitch angle of the target object according to image 1 and image 3 under the viewpoint; determining two spatial straight lines according to the longitudes and latitudes of the viewpoints and the viewing angles from the viewpoints to the bottom of the target object, which intersect forward, and calculating the intersection of the two straight lines, which is the longitude and latitude of the target object in the actual geographic space; calculating the distance from a viewpoint to the target object on a horizontal plane according to the longitude and latitude of the viewpoint and obtained longitude and latitude of the target object, calculating the relative heights from the viewpoint to the top and bottom of the target object respectively according to the pitch angles from the viewpoint to the top and bottom of the target object respectively and obtaining the actual height of the target object, which is the difference between the two relative heights.

The present invention effectively utilizes existing street view resources, achieves direct acquisition of geographic positions of surface features and measurement of actual heights of surface features in the street view map based on street view images and is conducive to the further application of existing street view resources in the aspects of smart city and intelligent transportation.

DETAILED DESCRIPTION OF PREFERRED EMBODIMENTS

The present invention will now be further described by referring to the accompanying drawings and embodiments.

Embodiment 1

Figure 1:
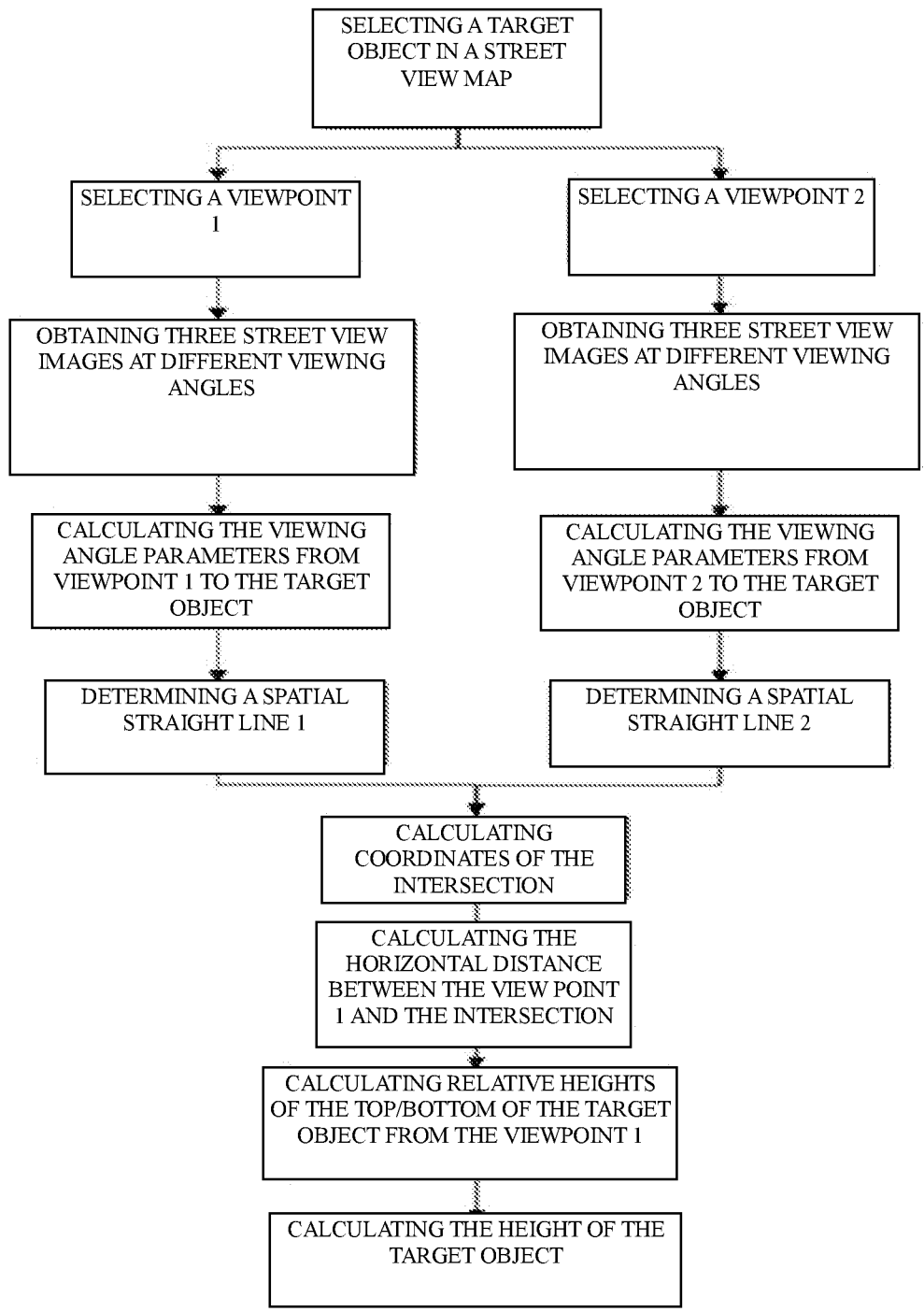
FIG. 1 is a flow chart according to Embodiment 1 of the present invention.

This embodiment takes street view map of Google as an example and further describes a technical solution of the present invention. As shown in FIG. 1, the flow of the present invention comprises the following steps:

Step 1: selecting two viewpoints in the viewing angle range covering the target object to be measured and calculated in the street view map;

Step 2: obtaining the longitudes and latitudes of the two selected viewpoints;

Step 3: obtaining three street view images: street view image 1, street view image 2 and street view image 3 at different viewing angles under the two viewpoints respectively, wherein the street view image 1 is a reference image, the street view image 2 and the street view image 1 have different horizontal angles and a same pitch angle, and the street view image 3 and the street view image 1 have a same horizontal angle and different pitch angles;

Step 4: calculating the viewing angles from the two viewpoints to a point on the bottom of the target object, including horizontal angle and pitch angle; said point on the bottom of the target object is the central point or angular point of the bottom of the target object;

Step 5: establishing two spatial straight lines according to the two viewpoints in step 4 and a point on the bottom of the target object, which intersect forward, and calculating the longitude and latitude of the intersection, i.e., the actual geographic position of the target object;

Step 6: calculating the distance from any of the two selected viewpoints to the target object, and calculating the relative heights of the bottom and top of the target object from the viewpoint according to the pitch angles from the viewpoint to a point on the bottom/top of the target object; said point on the bottom or top of the target object is the angular point/central point on the bottom or top of the target object; the line connecting a point selected on the bottom and a point selected on the top is a vertical straight line;

Step 7: obtaining the actual height of the target object from the relative heights between the bottom/top of the target object and the viewpoint.

The specific implementation steps are as follows:

Step 1: selecting a specific target object at first and then selecting two different appropriate viewpoints in the Google street view map;

Said viewpoints mean the geographic positions where the camera is located when shooting the street view images, and are expressed with longitudes and latitudes. Different viewpoints mean different geographic positions where the camera is located when shooting street view images. Appropriate viewpoint means that through rotation and adjustment of the street view images shot by a camera in this position, the entirety of the target object can be seen clearly without blockage of obstacles.

Step 2: obtaining the longitudes and latitudes of two street view viewpoints according to relevant service of Google street view map; the shooting parameters of the street view map contain information of longitudes and latitudes of the viewpoints, and other street view maps may acquire information of longitudes and latitudes of viewpoints by corresponding methods. Longitudes and latitudes of viewpoints may be obtained according to API of Google Street view map API. The specific codes are as follows:

// obtain the longitude and latitude of a viewpoint
    var lat=panorama.getPosition( ).lat( );
    var lng=panorama.getPosition( ).lng( );

Where lat is the latitude of the viewpoint, and lng is the longitude of the viewpoint;

Step 3: obtaining the longitudes and latitudes of the viewpoints according to step 2, and obtaining three street view images at different viewing angles under the two viewpoints respectively based on Google Street View Image API, wherein the street view image 1 is a reference image and its pitch angle is 0, street view images 2 and 1 have different horizontal angles and a same pitch angle, and the street view images 3 and 1 have a same horizontal angle and different pitch angles;

Said selection of viewpoints means that street view images are rotated and adjusted to make the target object located in an appropriate position of the screen, and images are scaled up or down so that the target object is neither too small to see clearly and nor too large to be within the range of the screen.

Said horizontal angle and pitch angle are parameters of viewing angle and express the azimuth information of the camera lens when the camera shoots street view images.

Said horizontal angle means the compass heading of the lens of the camera in use. The range of acceptable values is 0°~360° (both values denote north, 90° denotes east, and 180° denotes south).

Said pitch angle means the upward or downward angle of the lens of the camera in use relative to the Street View vehicle. A positive value means an upward angle of the camera lens (90° means the camera lens is vertically upward), while a negative value means a downward angle of the camera lens (−90° means the camera lens is vertically downward).

Figure 2A:
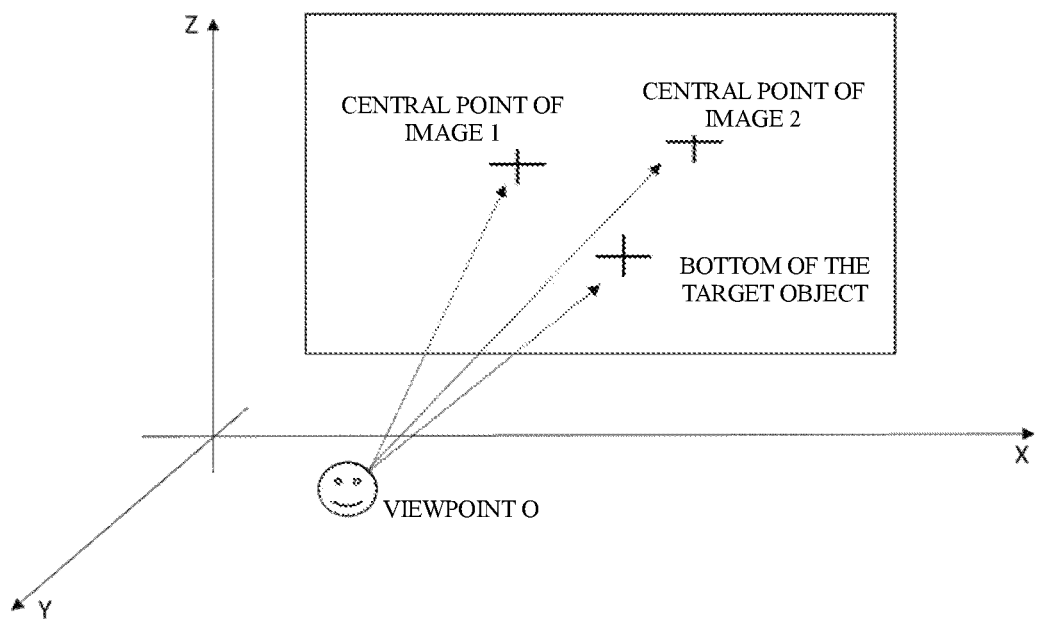
FIG. 2a is a schematic diagram showing the positions of a viewpoint, the central points of street view images and the target object in the solving process of horizontal angles according to Embodiment 1 of the present invention.
Figure 2B:
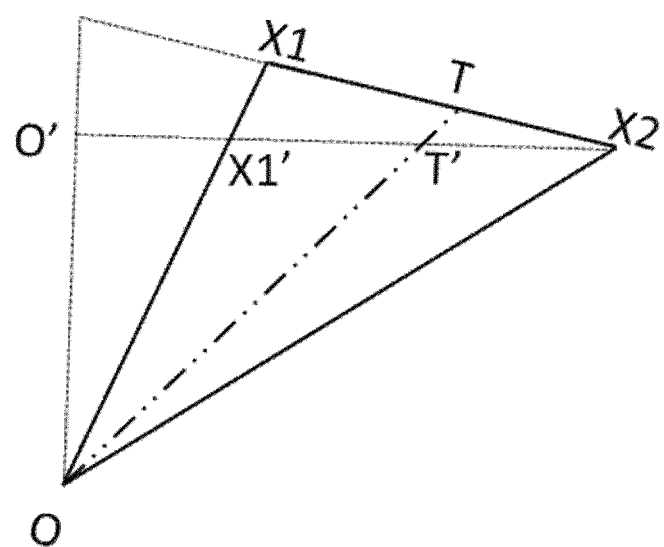
FIG. 2b is a result diagram of projection of the positions of a viewpoint, the central points of street view images and the target object onto the horizontal plane of the viewpoint in the solving process of horizontal angles according to Embodiment 1 of the present invention.

In this embodiment, a request for obtaining said street view images is an HTTP URL in the following format: https://maps.googleapis.com/maps/api/streetview?parameters For other street view maps, corresponding methods may be adopted to obtain corresponding street view images;

In this embodiment, the parameters of obtained street view images include: location (it may be a character string of text (such as Chagrin Falls, Ohio), or latitude/longitude value (40.457375,−80.009353), size (the output size of an image is expressed with pixel), heading (horizontal angle, means the compass heading of the camera lens), pitch (pitch angle, the upward or downward angle of the designated camera lens relative to the Street View vehicle);

Step 4: calculating the horizontal angle from each viewpoint to the target object according to the street view images 1 and 2 to which the viewpoint corresponds, and calculating the pitch angle to the target object according to street view images 1 and 3 under the viewpoint;

As shown in FIG. 2a and FIG. 2b, the process of solving the horizontal angle from said viewpoint to the target object is as follows:

Firstly, the pixel positions of the central point of the street view image 2 and the bottom of the target object are marked in the street view image 1; the central point X1 of the street view image 1, the central point X2 of the street view image 2 and the bottom T of the target object are projected on the horizontal plane where the viewpoint O is located. A straight line OO1 is drawn via the viewpoint O in a direction at a horizontal angle of 0, and a perpendicular line of OO1 is drawn via X2, with the foot of perpendicular being O', where the intersection between O'X2 and OX1 and the intersection between O'X2 and OT are X1' and T' respectively; The horizontal angle of the target object at this viewpoint is calculated, i.e., ∠O'OT is calculated, and set as ht. The horizontal angles of the centers of street view images 1 and 2 are known, i.e., ∠O'OX1 and ∠O'OX2, expressed with h1 and h2.

$$\tan h1 = \frac{O'X1'}{OO'} \quad \text{(Formula 1)}$$

$$\tan h2 = \frac{O'X2'}{OO'} \quad \text{(Formula 2)}$$

$$\tan ht = \frac{O'T'}{OO'} \quad \text{(Formula 3)}$$

From (Formula 2)−(Formula 1) and (Formula 3)−(Formula 1), (Formula 4) and (Formula 5) are obtained:

$$\tan h2 - \tan h1 = \frac{O'X2'}{OO'} - \frac{O'X1'}{OO'} = \frac{X1'X2'}{OO'} \quad \text{(Formula 4)}$$

$$\tan ht - \tan h1 = \frac{O'T'}{OO'} - \frac{O'X1'}{OO'} = \frac{X1'T'}{OO'} \quad \text{(Formula 5)}$$

From (Formula 4)/(Formula 5), (Formula 6) is obtained:

$$\frac{(\tan h2 - \tan h1)}{\tan ht - \tan h1} = \frac{X1'X2}{X1'T'} \quad \text{(Formula 6)}$$

From (Formula 6), the following formula may be obtained:

$$\tan ht = (\tan h2 - \tan h1) * \frac{X1'T'}{X1'X2} + \tan h1$$

In actual calculation, ∠X1OX2 is in the range of 10°~15°, and the pixel distance between X1 and X2 is much smaller than the actual distance between point O and point X1. Therefore, in ΔOX1X2 and ΔOX1'X2, $$\frac{X1\prime T\prime}{X1\prime X2}$$

is approximately equivalent to $$\frac{X1T}{X1X2}.$$

where $$\frac{X1T}{X1X2}$$

may be obtained from the pixel position of each point in the image, so the horizontal angle of the bottom of the target object under this viewpoint can be calculated:

$$\tan ht = (\tan h2 - \tan h1) * \frac{X1T}{X1X2} + \tan h1$$

$$ht = \text{Arctan } ht$$

Figure 3A:
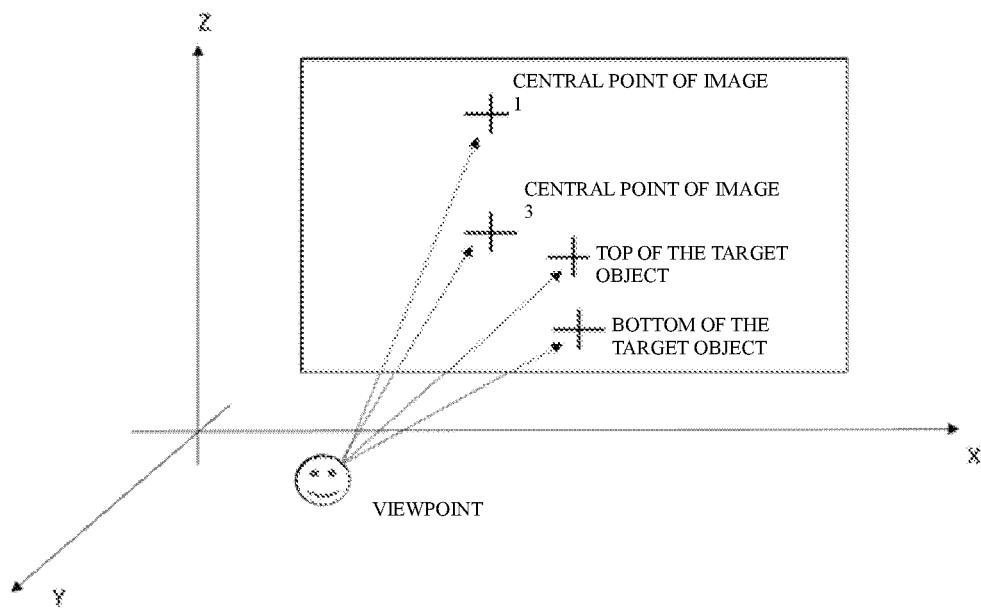
FIG. 3a is a schematic diagram showing the positions of a viewpoint, the central points of street view images and the target object in the solving process of pitch angles according to Embodiment 1 of the present invention.
Figure 3B:
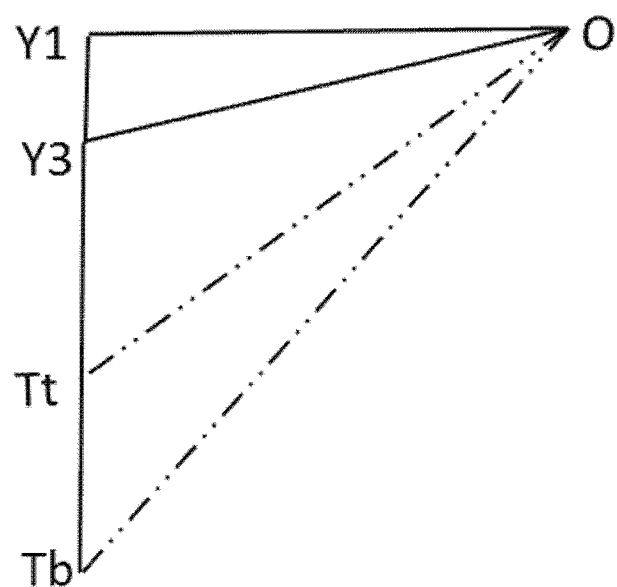
FIG. 3b is a result diagram of projection of the positions of a viewpoint, the central points of street view images and the target object onto the vertical plane of the viewpoint in the solving process of pitch angles according to Embodiment 1 of the present invention.

As shown in FIG. 2a and FIG. 3b, the process of solving the pitch angle from said viewpoint to the target object is as follows:

Firstly, the pixel positions of the central point of the street view image 3 and the top and bottom of the target object are marked in the street view image 1; the central point Y1 of the street view image 1, the central point Y3 of the street view image 3, the top Tt of the target object and the bottom Tb of the target object are projected on the vertical plane where the viewpoint O is located.

The horizontal angles of the bottom and top of the target object under this viewpoint are calculated, i.e., ∠TtOY1 and ∠TbOY1 are calculated, set as pt and pb. It is known that the pitch angle of the central point of the street view image 1 is 0° and the pitch angle of the central point of the street view image 3 is p3.

$$\tan pt = \frac{Y1Tt}{Y1Y3} * \tan p3$$

$$\tan pb = \frac{Y1Tb}{Y1Y3} * \tan p3$$

Where $$\frac{Y1Tt}{Y1Y3} \text{ and } \frac{Y1Tb}{Y1Y3}$$

can be calculated according to the distances of image pixel points. Thereby the pitch angles of the bottom and top of the target object under the current viewpoint can be obtained.

Figure 4:
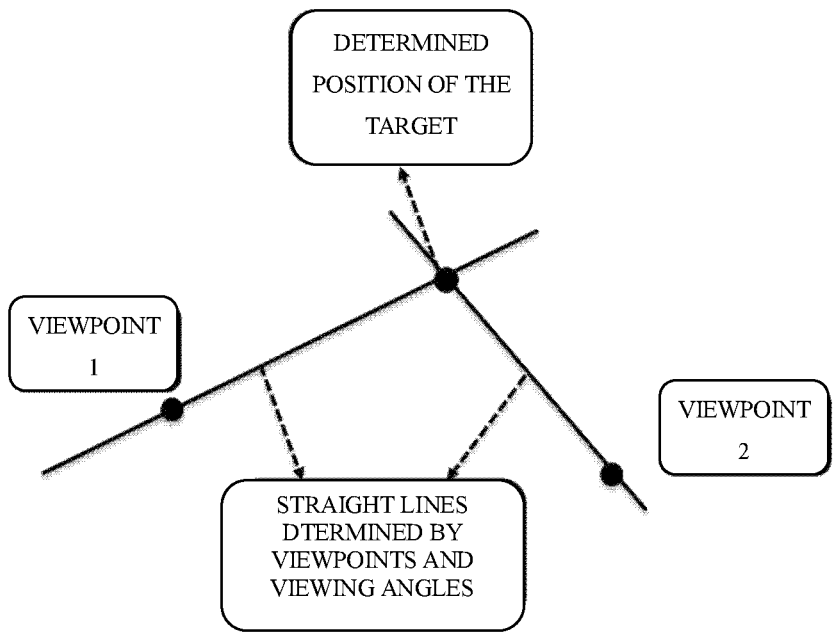
FIG. 4 is a schematic diagram for solving the geographic position of the target object according to Embodiment 1 of the present invention.
Figure 5:
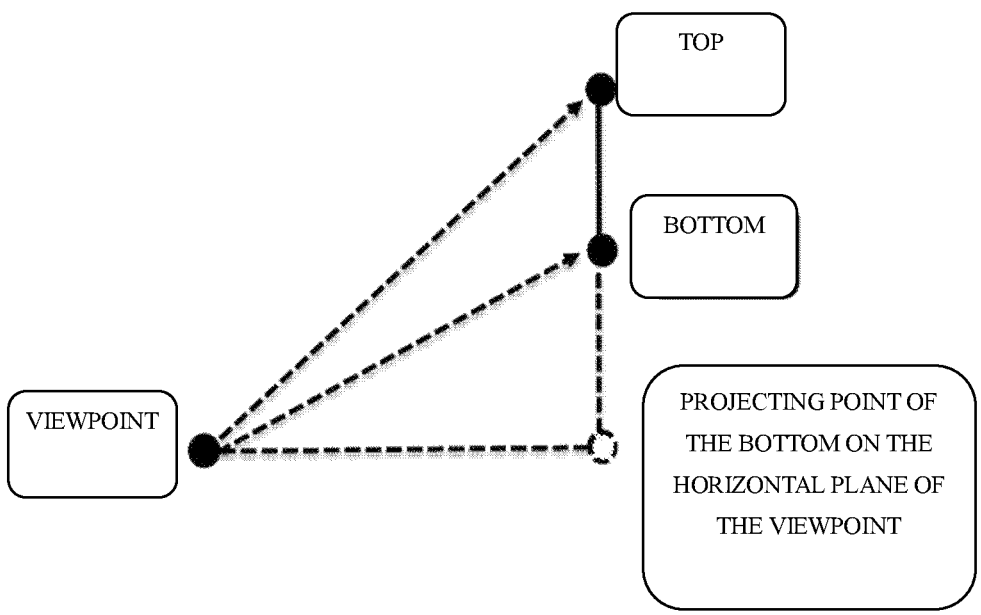
FIG. 5 is a schematic diagram for solving the actual height of the target object according to Embodiment 1 of the present invention.

Step 5: When the longitude and latitude of a viewpoint and the horizontal angle from the viewpoint to the bottom of the target object are known, a spatial straight line may be determined according to the polar coordinate system. As shown in FIG. 4, two different viewpoints establish two different spatial straight lines and intersect forward, and the actual geographic position of the target object is determined. The specific codes are as follows:

// k1 and k2 are slopes of two spatial straight lines
vark1=1/Math. Tan(rad(angleT1));
vark2=1/Math.Tan(rad(angleT2));
// b1 and b2 are intercepts of two spatial straight lines
var b1=lat1−k1*lng1;
var b2=lat2−k2*lng2;
//target longitude and latitude
var tlng=(b2−b1)/(k1−k2);
var tlat=tlng*k1+b1;

Where tlng is the longitude of the target point, and tlat is the latitude of the target point;

Step 6: as shown in FIG. 3, calculating the distance from a viewpoint to the bottom of the target object on a horizontal plane according to the longitude and latitude of the viewpoint and the longitude and latitude of the bottom of the target object, and calculating the relative heights of the top and bottom of the target object from the viewpoint respectively according to the pitch angles from the viewpoint to the top and bottom of the target object, as shown in FIG. 5. The specific codes are as follows:

// calculate the distance between two points according to the viewpoints and the longitude and latitude of the bottom of the target object

```
var xyDistance = GetDistance(latT,lngT,lat,lng);
function GetDistance( lat1, lng1, lat2, lng2)
{
    var radLat1 = rad(lat1);
    var radLat2 = rad(lat2);
    var a = radLat1 − radLat2;
    var b = rad(lng1) − rad(lng2);
    var s = 2 * Math.asin(Math.sqrt(Math.pow(Math.sin(a/2),2) +
        Math.cos(radLat1)*Math.cos(radLat2)*Math.pow(Math.sin(b/2),2)));
    s = s * EARTH_RADIUS; // earth radius
    s = Math.round(s * 10000) / 10;
    return s;
}
```

// calculate the relative height of the target object from the viewpoint according to pitch angle and the horizontal distance between the target object and the viewpoint
var z1=xyDistance*Math.tan(pitchBottom/180*Math.PI);
var z2=xyDistance*Math.tan(pitchTop/180*Math.PI);

Where z1 is the relative height between the bottom of the target object and the viewpoint, and z2 is the relative height between the top of the target object and the viewpoint;

Step 7: obtaining the actual height of the target object by subtracting the relative height between the bottom of the target object and the viewpoint from the relative height between the top of the target object and the viewpoint. The specific codes are as follows:

//obtain the actual height of the target object by subtracting the relative height between the bottom of the target object and the viewpoint from the relative height between the top of the target object and the viewpoint
var height=z2−z1;

The calculated height is the actual height of the target object.

What is claimed is:

1. A method for three-dimensional measurement and calculation of the geographic position and height of a target object in street view images, wherein the method comprises the following steps:

step 1: selecting two viewpoints in the viewing angle range covering the target object to be measured and calculated in the street view map;

step 2: obtaining the longitudes and latitudes of the two selected viewpoints;

step 3: obtaining three street view images: street view image 1, street view image 2 and street view image 3 at different viewing angles under the two viewpoints respectively, wherein the street view image 1 is a reference image, the street view image 2 and the street view image 1 have different horizontal angles and a same pitch angle, and the street view image 3 and the street view image 1 have a same horizontal angle and different pitch angles;

step 4: calculating the viewing angles from the two viewpoints to a point on the bottom of the target object, including horizontal angle and pitch angle;

step 5: establishing two spatial straight lines according to the two viewpoints in step 4 and a point on the bottom of the target object, which intersect forward, and calculating the longitude and latitude of the intersection, i.e., the actual geographic position of the target object;

step 6: calculating the distance from any of the two selected viewpoints to the target object, and calculating the relative heights of the bottom and top of the target object from the viewpoint according to the pitch angles from the viewpoint to the bottom and top of the target object; and step 7: obtaining the actual height of the target object from the relative heights between the bottom/top of the target object and the viewpoint, wherein the method acquires the actual geographic position and the actual height as surface features of the target object from the street view images.

2. The method according to claim 1, wherein in said step 1, during selection of viewpoints, an appropriate viewpoint is determined if the target object is adjusted to an appropriate position of the street view map by rotating the street view map;

specifically, under a viewpoint, if the target object is roughly located in the center of the screen and clearly brought into the field of view as a whole without blockage of obstacles by rotating and adjusting street view images, then this viewpoint is selected.

3. The method according to claim 1, wherein in said step 2, longitudes and latitudes of viewpoints are obtained from the shooting parameters of the viewpoints.

4. The method according to claim 1, wherein in said step 3, three street view images at different viewing angles are obtained under the two viewpoints respectively, wherein the street view image 1 is a reference image and its pitch angle is 0, street view images 2 and 1 have different horizontal angles and a same pitch angle, and the street view images 3 and 1 have a same horizontal angle and different pitch angles; and during selection of viewpoints, street view images are rotated and adjusted to make the target object located in an appropriate position of the screen, and images are scaled up or down so that the target object has a size between a user-specific minimum size and a range of the screen.

5. The method according to claim 1, wherein said step 4 comprises: calculating the horizontal angle from the viewpoint to the target object according to the street view images 1 and 2 to which the viewpoint corresponds, and calculating the pitch angle from the viewpoint to the target object according to the street view images 1 and 3 to which the viewpoint corresponds.

6. The method according to claim 1 or 5, wherein in said step 4, said point on the bottom of the target object is the central point or angular point of the bottom of the target object.

7. The method according to claim 1, wherein said step 5 comprises: establishing two spatial straight lines in a polar coordinate system according to two viewpoints and the horizontal angles from the viewpoints to the bottom of the target object, which intersect forward, and calculating the longitude and latitude of the intersection, i.e., the longitude and latitude of the target object.

8. The method according to claim 1, wherein in said step 6, the relative heights between the bottom/top of the target object and the viewpoint are calculated by the following method: calculating the distance from any viewpoint to the target object on a horizontal plane according to the longitude and latitude of the viewpoint and the longitude and latitude of the bottom of the target object; and calculating the relative heights of the bottom and top of the target object from the viewpoint respectively according to the pitch angles from the viewpoint to the top and bottom of the target object.

9. The method according to claim 1 or 8, wherein in said step 6, said point on the bottom or top of the target object is the angular point/central point on the bottom or top of the target object; and the line connecting a point selected on the bottom and a point selected on the top is a vertical straight line.

10. The method according to claim 1, wherein in said step 7, the actual height of the target object is calculated by the following method: obtaining the actual height of the target object by subtracting the relative height between the bottom of the target object and the viewpoint from the relative height between the top of the target object and the viewpoint.

11. The method according to claim 5, wherein in said step 4, said point on the bottom of the target object is the central point or angular point of the bottom of the target object.

12. The method according to claim 8, wherein in said step 6, said point on the bottom or top of the target object is the angular point/central point on the bottom or top of the target object; and the line connecting a point selected on the bottom and a point selected on the top is a vertical straight line.

* * * * *